9356X
J. M. Hubbard,
Bee Hive.
9,356 X
Patented Feb. 5. 1836.
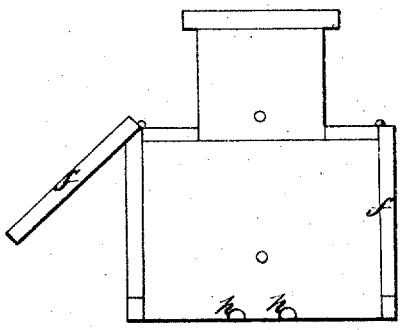
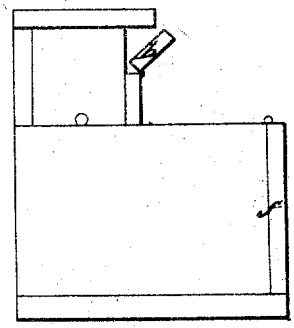
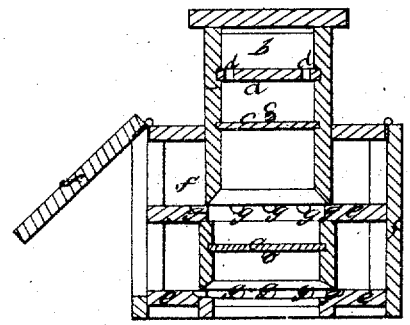
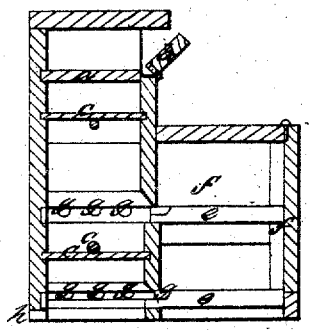

Feb. 5. 1836 9356X 1

James M. Hubbard of Canterbury, county of Merrimack and State of Newhampshire

Letters Patent

The Schedule referred to in these Letters Patent, and making part of the same containing a description in the words of the said James M. Hubbard himself of his improvement in the Bee Hive

---

Be it known, that I, James M. Hubbard of Canterbury in the county of Merrimack and State of New Hampshire have invented a new and useful improvement in the Bee hive, and the following is a full and accurate description of the said improvement. A hive is constructed about twelve inches square with a cover nailed fast on the top like that of the hive in common use. A floor is made in the hive about five inches from the top - Below this floor are sticks laid horizontally to support the Honey comb as in the Hive in common use - In the back side of the Hive is a door sufficiently large to open the hive from the first floor to the top of the hive - Through this floor are several holes, three fourths of an inch in diameter near all the sides of the hive excepting the back side. Over these holes may be placed with the bottom upwards, cups, boxes glass tumblers, or vessels of any convenient size into which the bees readily enter and deposit the delicious fruits of their labour - Any of these vessels may be removed at pleasure in which case the aperture leading to it should be immediately closed or another vessel left in its place - It will be readily perceived that the bees cannot enter the room containing the vessels except they be within those vessels - If a vessel like a cup or tumbler be used with the open end downward, a plate of wood should cover the open end with a hole at one edge of it, for the bees to enter, lest the vessel should be glued by the Bees to the floor of the hive. In addition to that portion of the hive already described there are two other stories the centre hive resting on the floor of the first - The floors of these stories project into the body of the main hive, half an inch for the bees to walk and rest upon, these floors being fluted or grooved in some places at their edge to let the bees pass in a horizontal manner from the principal hive to the chambers or outward stores - It is obvious that the fluted or horizontal channels projecting into the main hive make the most convenient passage for the Bees and are preferable to holes in a perpendicular form - What I claim as my invention is the manner of constructing the outward stores with the horizontal channels fluted for the easy passage of the bees from the principal hive to the vessels in the outward rooms, and the arrangement with which they are connected with the inward hive - The front of the hive presents a smooth perpendicular surface, the projecting stores have doors to open and close at pleasure for the convenience of adjusting the vessels to the fluted channels as before described - By placing a piece of dry honey comb in the vessel, the bees will the more readily proceed to fill them. - Should the bees from the severity of the season at any time need feeding it may be done by placing a vessel of honey on the top floor or over the horizontal apertures in the projecting stores -

Witnesses
John Greenough
J. J. Bryant

James M. Hubbard -

J.H.

(Patented 5 July 1835)

624 [illegible]

Drawing